US008419130B2

(12) United States Patent
Bergman (10) Patent No.: US 8,419,130 B2
(45) Date of Patent: Apr. 16, 2013

(54) SEAT TILT APPARATUS (75) Inventor: Hakan Bergman, Timra (SE)

(73) Assignee: Permobil AB, Timra (SE)

( * ) Notice: Subject to any disclaimer, the term of this patent is extended or adjusted under 35 U.S.C. 154(b) by 56 days.

(21) Appl. No.: 12/894,596

(22) Filed: Sep. 30, 2010

(65) Prior Publication Data
US 2012/0080245 A1    Apr. 5, 2012

(51) Int. Cl.
A61G 5/04 (2006.01)

(52) U.S. Cl.
USPC ...... 297/316; 297/354.13; 297/376; 297/325; 180/907

(58) Field of Classification Search ............ 297/316, 297/318, 340, 376, 354.13; 280/642, 643, 280/647, 648, 650, 47.38, 47.4, 47.41; 180/907
See application file for complete search history.

(56) References Cited

U.S. PATENT DOCUMENTS

| 4,655,471 | A | * | 4/1987 | Peek .......................... 280/250.1 |
| 5,044,647 | A | * | 9/1991 | Patterson .................... 280/250.1 |
| 5,181,762 | A | * | 1/1993 | Beumer ........................ 297/358 |
| 6,357,776 | B1 | * | 3/2002 | Goertzen et al. ........... 280/304.1 |
| 6,425,635 | B1 | * | 7/2002 | Pulver .......................... 297/343 |
| 6,641,214 | B2 | * | 11/2003 | Veneruso ...................... 297/322 |
| 7,090,240 | B2 | * | 8/2006 | Papac ........................... 280/647 |
| 7,610,638 | B2 | * | 11/2009 | Kramer et al. .................... 5/618 |
| 7,708,344 | B1 | * | 5/2010 | Broering et al. ............. 297/330 |
| 2009/0085324 | A1 | | 4/2009 | Blauch et al. |
| 2011/0215624 | A1 | * | 9/2011 | Laslo et al. ................... 297/329 |

* cited by examiner

Primary Examiner — John Walters
Assistant Examiner — Brian Swenson
(74) Attorney, Agent, or Firm — Holland & Hart LLP (57) ABSTRACT The invention concerns a seat tilt apparatus (3) for an electric wheelchair, which wheelchair comprises a chassis (1) and a seat (2). The seat tilt apparatus comprises; a base member (11), which is fixable to the chassis and provided with at least one first guide slot (16); a seat supporting member (40) which is arranged to supportably receive the seat, movable in relation to the base member and guided by the first guide slot; and a linear drive means (17) which is connected to the base member and to the seat supporting member, for moving the seat supporting member along a motion path, in relation to the base member. The seat supporting member comprises at least one first cam surface (43) facing in a first direction; and the base member comprises at least one first rotational support member (31), said first cam surface being arranged to be in supporting contact with said first rotational support member and formed for altering the angle between the seat supporting member and the base member during movement along a first interval of said motion path. The invention also concerns an electric wheelchair provided with such a seat tilt apparatus.

8 Claims, 5 Drawing Sheets

SEAT TILT APPARATUS

TECHNICAL FIELD OF THE INVENTION

The present invention relates generally to electric wheelchairs and particularly to an apparatus for tilting the seat of a wheelchair in relation to the chassis of the wheelchair. The invention also relates to a wheelchair provided with such an apparatus.

BACKGROUND OF THE INVENTION

Wheelchairs, especially electrically driven wheelchairs often have means for adjusting the position of the seat in relation to the chassis. These means may comprise a seat lift for vertically adjusting the height of the seat and a backrest tilt arrangement for tilting the backrest of the seat in relation to the bottom of the seat, i.e. for changing the angle between the backrest and the bottom of the seat.

Modern wheelchairs may additionally be provided with an electrically driven seat tilt apparatus, by which the entire seat, including the bottom and backrest may be tilted in relation to the chassis of the wheelchair. Such seat tilt apparatuses are provided for facilitating changing the body weight of the wheelchair occupant, to thereby avoid injuries, numbness and other inconveniences otherwise caused by static positioning of the occupant.

At one known type of seat tilt apparatuses the entire seat is tilted around a transverse horizontal axis, which axis is stationary in relation to the chassis. While allowing easy change of the occupant's body weight, this known type of seat tilt causes the center of gravity of the seat and occupant to move backwards during tilting. Such backward movement of the center of gravity is disadvantageous since it decreases the stability of the wheelchair and may even cause the wheelchair to fall over.

In order to solve this problem different so-called constant center of gravity seat tilt devices have been suggested. At these types of seat tilt arrangements the axis around which the seat is tilted moves forwardly during the tilting operation. U.S. Pat. No. 6,032,976 discloses one such apparatus, comprising a seat frame which, at a rear end, is pivotally connected to a transverse support member. The support member is guided in opposing horizontal linear slots arranged in a base frame of the wheelchair. The seat frame is also connected to the base frame by means of a tilt arm linkage, which is formed of two bars that are pivotally connected to opposing sides of the seat frame, forward of its rear end, and to the base frame. An electrical drive member is at a forward end connected to the base frame and at a rear end connected to the transverse support member. By actuating the drive member, the support member and the rear part of the seat frame is moved forwardly while being guided by the linear slots in the base member. During this movement, the two bars force the seat frame to tilt upwards around the pivot axis, which is defined by the opposing pivotal connections between the rear end of the seat frame and the transverse support member.

US 2007/0102615 A1 discloses another seat tilt apparatus comprising a base member with a guide slot, a seat supporting member which is movable in relation to the base member by means of a linear drive member and guided by the guide slot and a pivotal arm connecting the base member and the seat supporting member. For reducing the force required for initiating tilting and increasing the speed at which tilting is continued, the guide slot comprises two portions arranged at mutually different directions of extension.

Even though the arrangements according to U.S. Pat. No. 6,032,976 and US 2007/0102615 allow for tilting of the seat while keeping the center of gravity of the seat and occupant approximately constant in relation to the chassis of the wheelchair, these arrangements are impaired with certain disadvantages.

SUMMARY OF THE INVENTION

It is therefore an object of the present invention to provide an enhanced seat tilt apparatus for an electric wheelchair, which seat tilt apparatus comprises a base member, a seat supporting member and a linear drive means for moving the seat supporting member along a motion path in relation to the base member.

Another object is to provide such a seat tilt apparatus, which is simple in construction and reliable in use.

It is a further object to provide such a seat tilt apparatus comprising a comparatively low number of movable parts.

A still further object is to provide such a seat tilt apparatus which enables reliable and comfortable tilting without the use of any pivotal linkage arms.

Yet another object is to provide such a seat tilt apparatus at which the required power for achieving tilting may be kept comparatively low.

Still another object is to provide such a seat tilt apparatus at which the relation between required power and the angular alteration may be easily adapted for different motion intervals along the motion path of the seat supporting member.

One aspect of the invention concerns a seat tilt apparatus for a wheelchair, which wheelchair comprises a chassis and a seat. The seat tilt apparatus comprises a base member, which is fixable to the chassis and provided with at least one first guide slot. A seat supporting member is arranged to supportably receive the seat, movable in relation to the base member and guided by the first guide slot. A linear drive means is connected to the base member and to the seat supporting member, for moving the seat supporting member along a Motion path, in relation to the base member. The seat supporting member comprises at least one first cam surface facing in a first direction. The base member comprises at least one first rotational support member. Said first cam surface is arranged to be in supporting contact with said first rotational support member and formed for altering the angle between the seat supporting member and the base member during movement along a first interval of said motion path.

In this way, alteration of the tilt angle between the seat supporting member and the base member is, at least during movement along a portion of the motion path, effected by the first cam surface which is displaced in relation to and in contact with the first rotational support member. By this means, tilting of the seat may be easily accomplished without the use of any link arm arrangement. Hereby, the number of movable parts may be kept low and the constructional dimensions, especially the height of the till apparatus may be kept small.

With the inventive seat tilt apparatus applied to a wheelchair comprising chassis and a seat, the axis of rotation for the tilting movement is moved forward in relation to the chassis during backward tilting of the seat. Hereby, the center of gravity of the seat and occupant is readily kept generally at a constant longitudinal position in relation to the chassis.

During movement of the seat supporting member, the change of tilt angle in relation to the longitudinal displacement of the first cam surface relative to the first rotational support member corresponds to the gear ratio of the tilt apparatus. The gear ratio is thereby determined by the shape of the first cam surface along its longitudinal extension, i.e. by the longitudinal curvature of the cam surface. By selecting a suitable longitudinal cam surface curvature, it is possible to achieve an optimal gear ratio at each position along the longitudinal extension of the first cam surface. The longitudinal curvature of the first cam surface may e.g. be selected such that the gear ratio is low at the beginning of a tilting movement of the seat support member from a horizontal position, where the gravity acting on the seat and the occupant fully counteracts the tilting movement. The cam surface curvature may further be selected such that the gear ratio gradually increases as the seat support member assumes a gradually increasing tilt angle, whereby the counteraction caused by the gravity, decreases. With the inventive tilt apparatus, reliable and fast tilting may be achieved at a comparatively low power consumption also when heavy loads are acting on the seat support member. The invention also allows for that a comparatively small electric motor having low power consumption may be utilized.

The seat supporting member preferably comprises at least one second cam surface facing in a second direction, which is opposite to said first direction. The base member then preferably comprises at least one second rotational support member being arranged to be in supporting contact with said second rotational support member and formed for altering the angle between the seat supporting member and the base member during movement along a second interval of said motion path.

During backward tilting from a horizontal starting position of the seat supporting member, the gravity acting on the seat and occupant will initially counteract the tilting movement. When the seat support member has been tilted to pass a certain angle of equilibrium, the gravity will instead act in a direction of continued backward tilting. The second cam surface and the second rotational support member are arranged for counteracting the gravitational force acting in a direction of continued backward tilting once the angle of equilibrium has been passed. By this means, the seat tilt apparatus allows for a readily and comfortably controlled tilting movement also when the gravitational force, act in the tilting direction.

During forward tilting, from a fully backwardly titled position to the horizontal starting position of the seat support member, the second cam surface and the second rotational support member initially acts against the gravitation to lift the seat. Once the angle of equilibrium has been passed, the gravitation will strive to continue the forward tilting. During such gravitation driven continued forward tilting, the first cam surface and first rotational support member counteracts the gravity to break and control the forward tilting motion. Hence, the first and second cam surfaces and rotational support members cooperate to drive and to brake and control the tilting movement at respective sides of the angle of equilibrium. Hereby a fully controlled and comfortable tilting motion may be accomplished during the entire tilting motion in both tilting directions between the horizontal starting position and the fully backwardly tilted position.

The seat supporting member may comprise a mounting plate for a seat and at least one guide member which is arranged generally perpendicular to the mounting plate and the first cam surface may be arranged at an outer edge of said guide member. Hereby a reliable, space saving and simple construction is accomplished.

A second guide slot may be arranged in said at least one guide member and the at least one second cam surface may be arranged at an edge of said second guide slot. This further contributes to a space saving and reliable construction and allows for an efficient use of the constructional height of the seat supporting member.

The seat tilt apparatus may comprise a resilient means for pretension of said at least one second rotational support member towards said at least one second cam surface. The resilient means contribute to achieving a smooth and comfortable passage of the angle of equilibrium during the tilting motion. In addition, the resilient means allows for that the cam surfaces may be machined and fabricated with a comparatively low accuracy and that the rotating support members, during assembly may be positioned with a reduced accuracy.

The linear drive means may comprise an electrical motor fixed to the base member; a rotational threaded rod connected to the motor and a drive member which is threaded onto the threaded rod and fixed to the seat supporting member. Hereby, a simple, space saving and yet very reliable and power efficient drive means is provided.

The base member may comprise two first guide slots, two first rotational support members and two second rotational support members, each of the first guide slots, the first rotational members and the second rotational members being arranged at opposing lateral sides of the base member. The seat supporting member may then comprise a seat mounting plate and two guide members arranged generally perpendicular to the mounting plate, at respective lateral sides of the seat mounting plate, each guide member comprising a respective first cam surface and a respective second cam surface. This allows for that the tilting motion is guided and controlled at each lateral side of the seat support member. Hereby the stability and balance of the apparatus is enhanced. This embodiment further results in that the load exerted by the seat and occupant is equally distributed to both sides of the apparatus, whereby the dimensions of load carrying parts may be reduced correspondingly.

The linear drive means may be arranged centrally between and generally in parallel with the lateral sides of the base member and the seat supporting member. Hereby a reliable and well balanced drive of the tilt motion may be accomplished by means of a single, comparatively small drive means having a comparatively low power consumption.

According to a second aspect, the invention concerns a wheelchair comprising a chassis, a seat and a seat tilt apparatus as set out above.

BRIEF DESCRIPTION OF THE DRAWINGS

In the following an exemplifying embodiment of the invention will be described, with reference to the drawings, wherein.

DETAILED DESCRIPTION OF THE INVENTION

Figure 1:
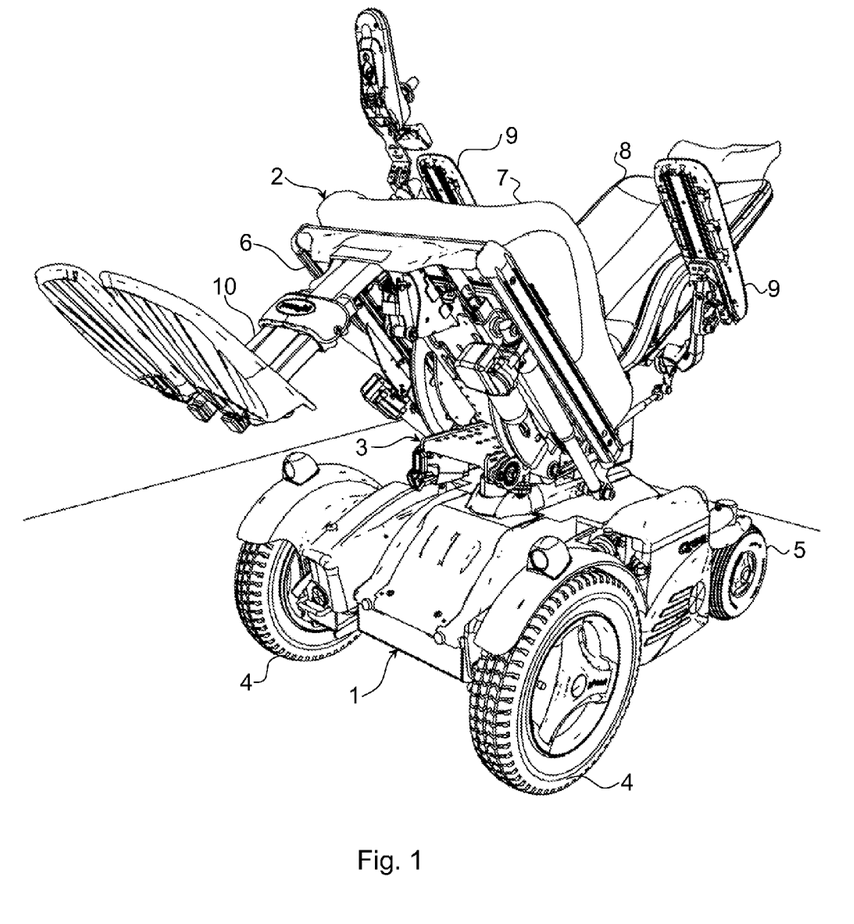
FIG. 1 is a schematic front perspective view of a wheelchair provided with a seat tilt apparatus according to the invention.

FIG. 1 shows an electrical wheelchair comprising a chassis 1, a seat 2 and a seat tilt apparatus 3 according to one embodiment of the invention. The chassis supports two front wheels 4, which are driven by electrically powered motors and a pivotal rear wheel 5. The chassis also comprise an electrical seat lift device (not shown) for vertical movement of the seat 2. In the figure, the seat lift is in its lowest position.

The seat 2 comprises a seat bottom 7, a backrest 8 and arm rests 9, which armrests are connected to the backrest 8. In the shown embodiment the backrest 8 is fixedly connected to the seat bottom 7. The backrest 8 may however also be pivotal in relation to the seat bottom by means of a backrest tilt arrangement, which is known per se to the skilled person. The seat bottom 7 is further fixed to a seat frame 6, which also supports a leg rest 10.

The seat frame 6 is fixed to the seat tilt apparatus 3 and the seat tilt apparatus is in turn fixed to a vertically movable part of the seat lift device.

Figure 2:
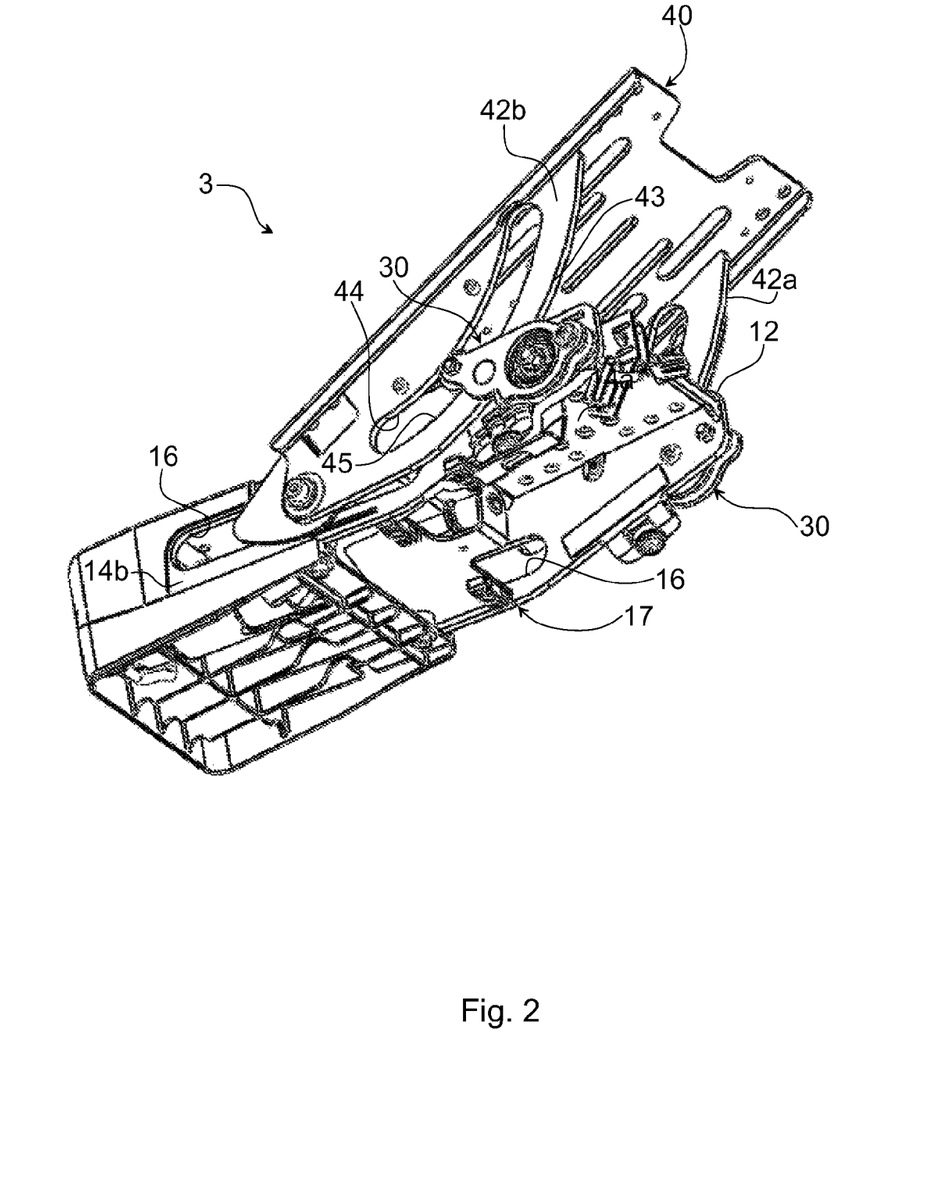
FIG. 2 is a perspective view of the seat tilt apparatus schematically illustrated in FIG. 1
Figure 3:
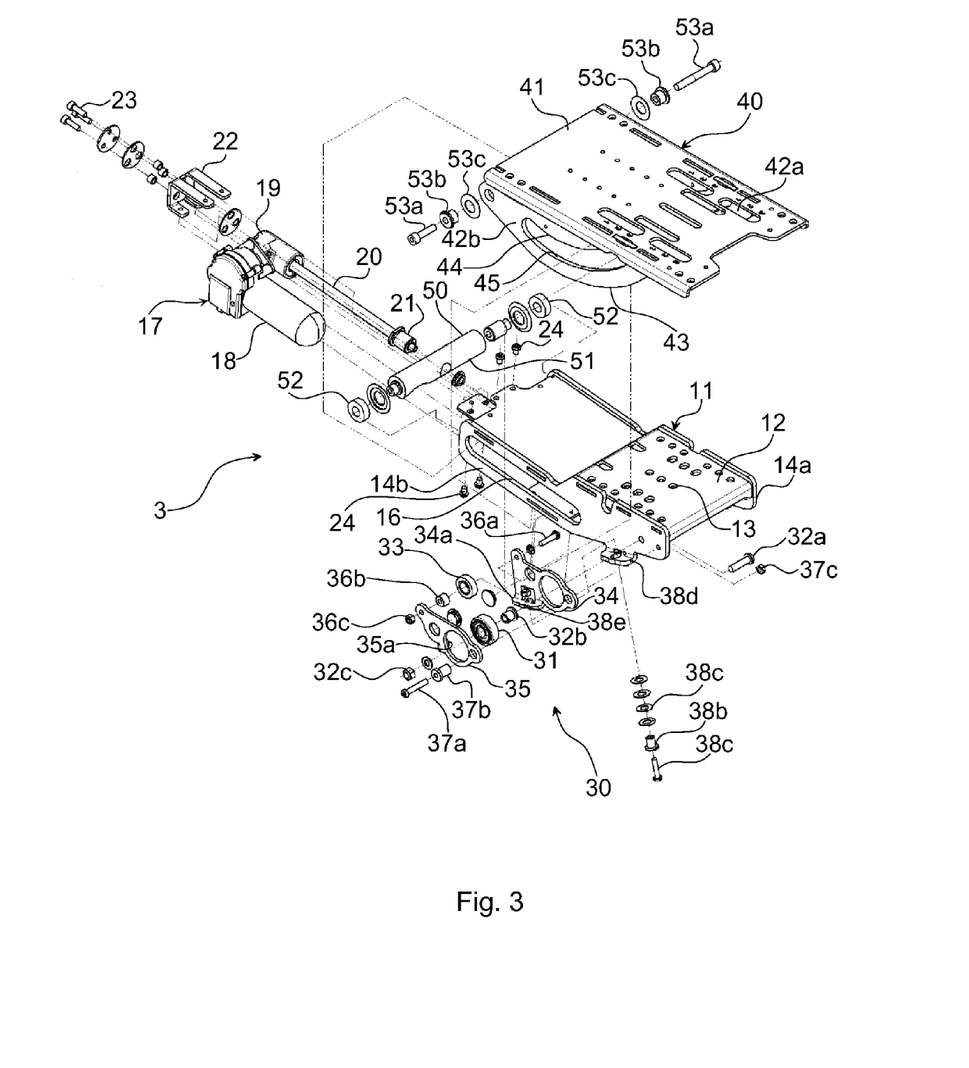
FIG. 3 is a an exploded view in perspective illustrating some parts of the seat tilt apparatus shown in FIG. 2.

With reference to FIGS. 2 and 3, the seat tilt apparatus comprises a base member 11, which is shown separately in FIG. 3. The base member 11 comprises, at a front end, a central mounting plate 12 with a plurality of mounting holes 13 for being secured by screws or the like to the vertically movable part of the seat lift or to a stationary part of the chassis. Hence, the seat lift may be omitted if desired. The base member 11 also comprises a left hand side member 14a and a right hand side member 14b. The side members 14a, 14b extend downwards from the mounting plate 12 in parallel to each other and perpendicular to the mounting plate 12. In the shown embodiment the side members 14a, 14b are separate parts fixedly secured to the mounting plate 12. The mounting plate 12 and side members may however also form an integral part. A first guide slot 16 is formed in each side member 14a, 14b. Each guide slot 16 is generally rectilinear.

A linear drive means 17 is fixed to the base member 11. The linear drive means comprises an electric motor 18, a gear device 19, a rotational threaded rod 20 and a drive member 21, which is threaded onto and rotary relative to the rod 20. The threaded rod 20 is connected to the motor 18 via the gear device 19. The linear drive means 17 is fixed to the base member 11 by means of a mounting bracket 22 and fastening screws 23, 24. The threaded rod 20 extends from the gear device 19, generally central between and in parallel with the side members 14 of the base member 11.

The base member 11 further comprises two rotational support assemblies 30. In FIG. 3 only one such rotational support assembly 30 being attached to the right hand side member 14b is shown. However and as indicated in FIG. 2 the exemplifying seat tilt apparatus 3 also comprises a further rotational support assembly 30 which is attached to the left hand side member 14a. In the following only the rotational support assembly 30 attached to the right hand side member 14b will be described in detail. It is however realized that the exemplifying seat tilt apparatus described also comprises a corresponding rotational support assembly attached to the left hand side member 14a.

The rotational support assembly 30 comprises a first rotational support member 31 in the form of a roller journalled in bearings. The first rotational support member is fixed to the right hand side member 14b by means of a bolted joint 32a-c. The assembly 30 also comprises a second rotational support member 33 in the form of a roller journalled in bearings. The second rotational support member 33 is fixed to and between two mounting plates 34, 35, by means of a bolted joint 36a-c. The mounting plates 34, 35 are engaged with each other by means of overlapping engagement tongues 34a, 35a. The two mounting plates 34, 35, and thereby the second rotational support member 33, are pivotally fixed to the right hand side member 14b, by means of a bolt 37a, a bearing sleeve 37b and a nut 37c. The rotational support assembly also comprises a resilient means 38 for pretension of the second rotational support member 33. The resilient means comprises a threaded bolt 38a which is received in a sleeve 38b having a radial collar at one end. A number of spring washers 38c are slipped onto the sleeve 38b and compressed between the radial collar of the sleeve and a lower surface of a folded tongue 38d of the side member 14b. The bolt 38a is slipped through a hole in the tongue 38d and threadedly received in a threaded hole 38e arranged in the engagement tongue 34a of mounting plate 34. By this means, the two mounting plates 34, 35 are resiliently urged to pivot about the bolt 37a in the anti-clockwise direction as seen in FIG. 3. Thereby the second rotational support member 33 is resiliently pressed downwards as seen in FIG. 3.

The seat tilt apparatus 3 further comprises a seat supporting member 40. The seat supporting member 40 comprises a seat mounting plate 41, a left hand guide member 42a and a right hand guide member 42b. The guide members 42, 42b are arranged at respective lateral sides of the seat mounting plate and project downwardly therefrom, generally in parallel with each other. In the shown embodiment the guide members 42a, 42b are separate parts fixedly secured to the seat mounting plate 41. The seat mounting plate 41 and the guide members 42a, 42b may however also form an integral part.

A shaft 50 is pivotally fixed to and between the rear ends of the guide members 42a, 42b. The shaft 50 exhibits a central hole 51 in which the drive member 21 is fixed. The drive member 21 is thus prevented from rotation relative to the shaft 50. A respective guide roller 52 is rotary arranged at each end of the shaft 50. The guide rollers 52 are received in and guided by a respective first guide slots 16 arranged in the side members 14a, 14b. The shaft 50 and the guide rollers 52 are pivotally fixed to the seat supporting member 40 by means of screw joints 53a-c. The screw joints 53a-c extend through a hole 54 in the respective guide member 42a, 42b and through a respective guide roller 52 and are threadedly secured to a respective end of the shaft 50.

In the following, the right hand guide member 42b is described more in detail. It is however understood that the same description also applies to the left hand guide member 42a. The guide member 42b exhibits a first cam surface 43, which is arranged at an outer and downwardly facing edge of the guide member 42b. The cam surface 43 has a generally convex curved shape along its longitudinal extension. A second guide slot 44 is arranged in the guide member 42b. A lower edge of the second guide slot 44 forms a second cam surface 45 which faces in the opposite direction with regard to the first cam surface 43. The second cam surface is arranged generally in parallel with the first cam surface 43, such that the distance between the first 43 and second 45 cam surfaces is essentially constant along the longitudinal extension of the cam surfaces 43, 45.

The base member 11 and the seat supporting member 40 are arranged such that the first cam surface 43 on each lateral side bears against the respective first rotational support member 31. Each second rotational support member 33 is arranged in a respective second guide slot 44 and is resiliently urged against the respective second cam surface 45.

Figure 4A:
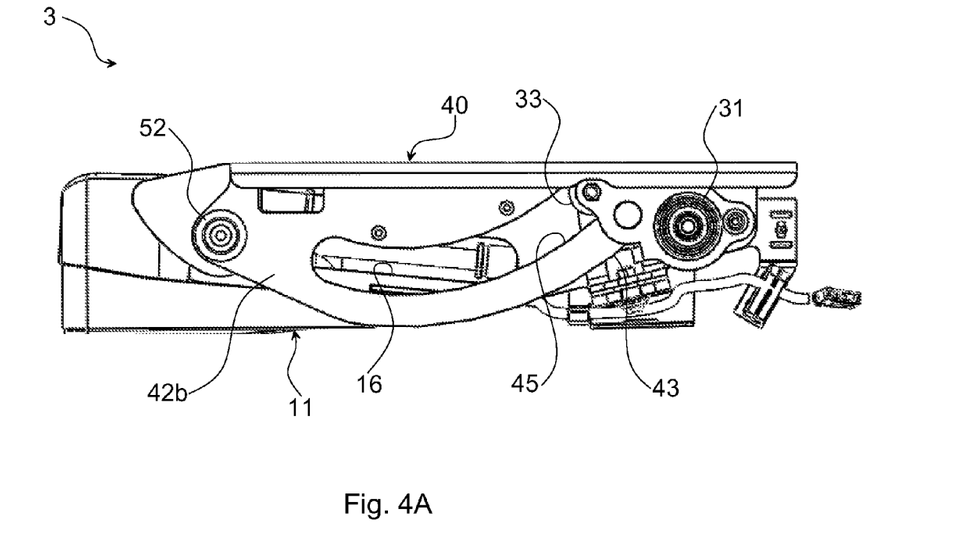
FIGS. 4A-C are side views showing the seat tilt apparatus in different positions, corresponding to the seat being horizontal, partially tilted and fully tilted.
Figure 4B:
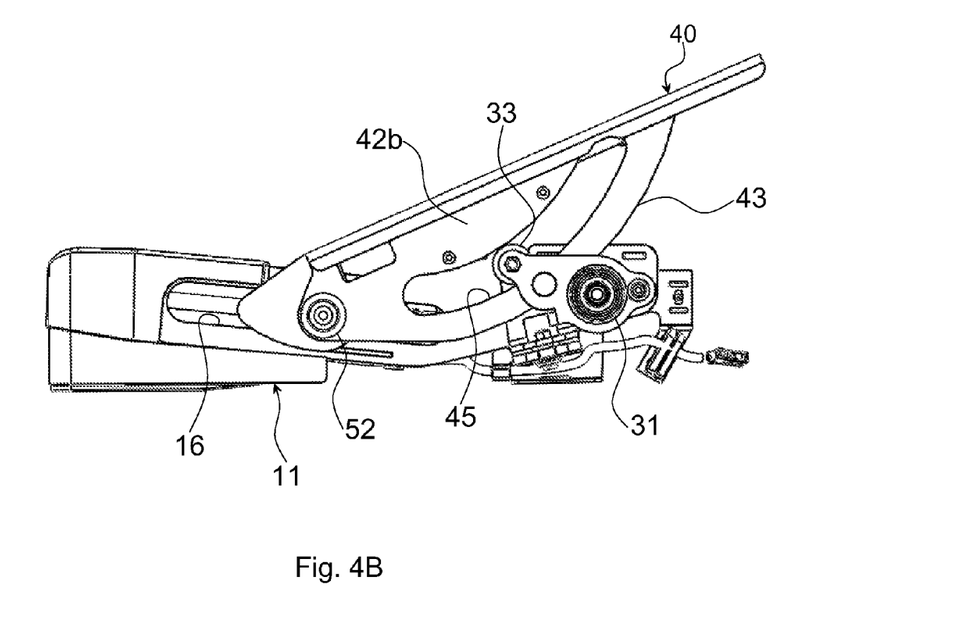
Figure 4C:
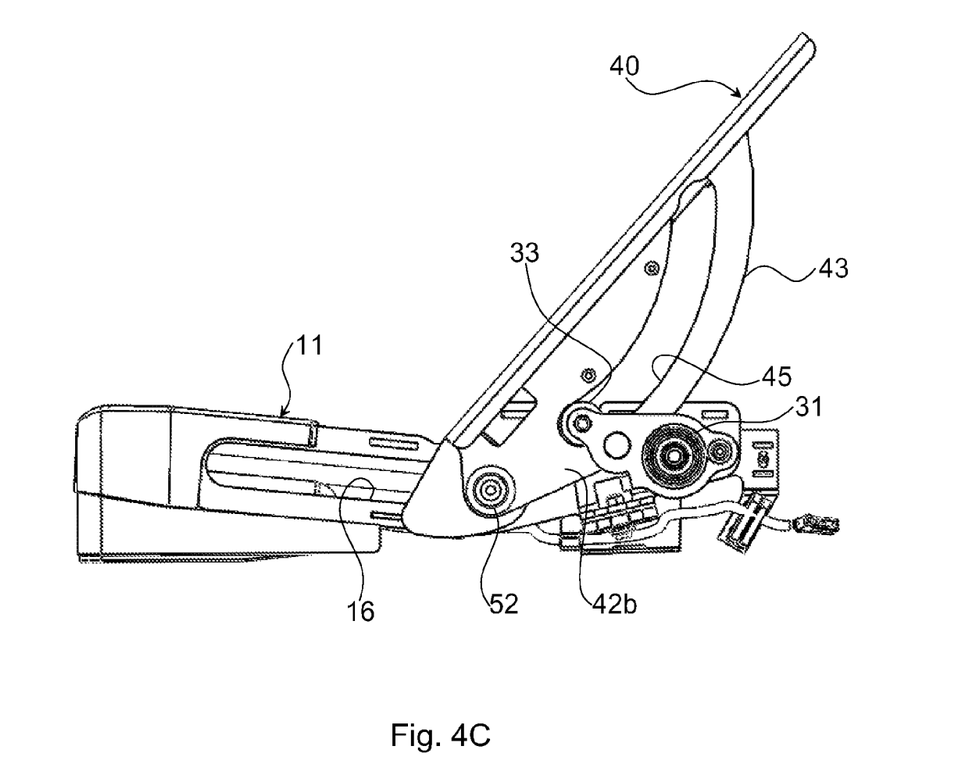

With reference to FIGS. 4A-C operation of the seat tilt apparatus will now be explained, In FIG. 4A the seat tilt apparatus 3 is shown in a starting position. In the starting position, the seat supporting member 40 is arranged in a generally horizontal position. The guide rollers 52 are positioned in the rear end of the respective first guide slot 16. This position of the seat tilt apparatus corresponds to that the seat 2 is in a non-tilted normal position.

When the seat is to be tilted backwards, the electric motor 18 is activated to rotate in a first rotational direction. The threaded rod 20 thereby rotates in a corresponding rotational direction. The drive member 21, which is threadedly arranged on the rod 20, is thereby displaced forwardly along the rod 20. The drive member 21 forces, via shaft 50, the seat supporting member 40 to be displaced forwardly. During the displacement of the seat supporting member 40, it's rear portion is guided by the engagement of the guide rollers 52 in the first guide slots 16. During forward displacement along a first interval of the movement of the seat supporting member 40, the gravity acting on the seat and the occupant of the seat will force the first cam surfaces 43 into contact with the respective first rotating support members 31. By cooperation between the first rotating support members 31 and the first cam surfaces 43, the front portion of the seat supporting member will be lifted upwards, whereby the seat supporting member is tilted backwardly about a tilt pivot axis defined by the centers of the guide rollers 52.

The curvature of the first cam surfaces 43 are, along a longitudinal portion corresponding to initial tilting, arranged in relation to the first rotational support members and to the direction of extension of the first guide slot 16, such that a certain length of forward displacement of the guide rollers 52 results in a comparatively small lifting of the front portion of the seat supporting member. During the initial tilting, the gear ratio of the seat tilt apparatus is thus comparatively low, such that the power required for the initial tilting, at which the gravity fully counter-acts the tilting movement, may be kept comparatively low.

Once the initial tilting has been accomplished, the gravitational forces acting against the tilting movement will gradually decrease as the guide rollers 52 and the tilt pivot axis approaches the vertical line through the center of gravity of the seat and the occupant. The curvature of the first cam surfaces, along a longitudinal portion which corresponds the subsequent tilting is arranged with a gradually increased gear ratio, such that the speed of the tilting movement increases as the gravitational counter-action decreases, while keeping the power required for accomplishing tilting essentially constant.

In FIG. 4B the seat tilt apparatus is illustrated in a position at which the tilting angle has reached an angle of equilibrium. At this angle of equilibrium, the center of gravity of the seat and the occupant is positioned essentially vertically above the tilt pivot axis defined by the center of the guide rollers 52. When continued backward tilting as described above has been effected such that the tilting angle has passed the angle of equilibrium, the gravitational forces acting on the seat and the occupant will strive to continue backward tilting about the tilt pivot axis. The load supported by the rotational support assemblies 30, thereby shifts from acting via the first cam surfaces 43 on the first rotational support members 31 to acting via the second cam surfaces 45 on the second rotational support members 33. Instead of driving the continued tilting movement, the electric motor is thereafter used to actively break and control the continued tilting to the fully tilted position shown in FIG. 4C. During passage of the angle of equilibrium, the resilient means 38 ensures that there is no play between the rotating support members and the cam surfaces such that the angle of equilibrium is passed without any disturbing or uncomfortable jerk or disruption. In correspondence with the first cam surface 43, the longitudinal curvature of the second cam surface 45 is shaped such that the gear ratio increases during the tilting movement from the angle of equilibrium (FIG. 4B) to the fully tilted position (FIG. 4C).

In the exemplifying embodiment, the fully backward tilted position corresponds to a tilt angle of approximately 50° from the horizontal starting position. The longitudinal direction of the first guide slots 16 are arranged forwardly sloping, with an angle of inclination of approximately 5.5° to the horizontal plane. This allows for that the comparatively large maximum tilt angle may be achieved with a comparatively short active length of the threaded rod 20 while still keeping the active lengths of the cam surfaces comparatively short.

From the fully tilted position shown in FIG. 4C, forward tilting to the starting position shown in FIG. 4A is accomplished in a corresponding manner as described above, by activating the electric motor for rotation in the opposite direction.

With the above described seat tilt apparatus it is possible to achieve reliable, smooth and comfortable tilting at a comparatively high speed and with an efficient usage of the electrical power supplied to the electric motor. The seat tilt apparatus further comprises a comparatively low number of moving parts which enhances reliability and service life and reduces the need of maintenance. The apparatus also allows for a space saving construction and especially for that the constructional height may be kept low.

Above, exemplifying embodiments of the invention have been described and illustrated. However, the invention should not be seen as limited to these embodiments but may be varied within the scope of the appended claims. In cases where the required tilt angle range does not exceed the angle of equilibrium it might be possible to dispense with the second cam surface and the second rotating support member. In cases where only a limited total load is to be applied to the seat support member, the seat tilt apparatus may comprise only one first cam surface and one first rotating support member. Further, the shape and arrangement of the cam surfaces may be varied, e.g. for accomplishing any desired varied gear ratio of the seat tilt apparatus during the tilting movement.

The invention claimed is:

1. Seat tilt apparatus fir an electric wheelchair, which wheelchair comprises a chassis and a seat, the seat tilt apparatus comprising;
   a base member, which is fixable to the chassis and provided with at least one first guide slot;
   a seat supporting member which is arranged to supportably receive the seat, movable in relation to the base member and guided by the first guide slot;
   a linear drive means which is connected to the base member and to the seat supporting member, for moving the seat supporting member along a motion path, in relation to the base member;
characterized in that the seat supporting member comprises at least one first cam surface facing in a first direction and at least one second cam surface facing in a second direction, which is opposite to said first direction; and the base member comprises at least one first rotational support member and at least one second rotational support member, said first cam surface being arranged to be in supporting contact with said first rotational support member and formed for altering the angle between the seat supporting member and the base member during movement along a first interval of said motion path and said second cam surface being arranged to be in supporting contact with said second rotational support member and formed for altering the angle between the seat supporting member and the base member during movement along a second interval of said motion path.

2. Seat tilt apparatus according to claim 1, comprising a resilient means for pretension of said at least one second rotational support member towards said at least one second cam surface.

3. Scat tilt apparatus according to claim 1, wherein said linear drive means comprises an electrical motor fixed to the base member; a rotational threaded rod connected to the motor and a drive member which is threaded onto the threaded rod and fixed to the seat supporting member.

4. Seat tilt apparatus according to claim 1, wherein the base member comprises two first guide slots, two first rotational support members and two second rotational support members each of the first guide slots, the first rotational members and the second rotational members being arranged at opposing lateral sides of the base member; and wherein the seat supporting member comprises a seat mounting plate and two guide members arranged generally perpendicular to the mounting plate, at respective lateral sides of the seat mounting plate, each guide member comprising a respective first cam surface and a respective second cam surface.

5. Seat tilt apparatus according to claim 4, wherein the linear drive means is arranged centrally between and generally in parallel with the lateral sides of the base member and the seat supporting member.

6. Electric wheelchair comprising a chassis, a seat and a seat tilt apparatus according to claim 1.

7. Seat tilt apparatus for an electric wheelchair, which wheelchair comprises a chassis and a seat, the seat tilt apparatus comprising;
   a base member, which is fixable to the chassis and provided with at least one first guide slot;
   a seat supporting member which is arranged to supportably receive the seat, movable in relation to the base member and guided by the first guide slot;
   a linear drive means which is connected to the base member and to the seat supporting member, for moving the seat supporting member alone a motion path, in relation to the base member;
characterized in that the seat supporting member comprises at least one first cam surface facing, in a first direction; and the base member comprises at least one first rotational support member, said first cam surface being arranged to be in supporting contact with said first rotational support member and formed for altering the angle between the seat supporting member and the base member during movement along a first interval of said motion path, wherein the seat supporting member comprises a mounting plate for a seat and at least one guide member which is arranged generally perpendicular to the mounting plate and wherein the first cam surface is arranged at an outer edge of said guide member.

8. Seat tilt apparatus according to claim 7, wherein a second guide slot is arranged in said at least one guide member and the at least one second cam surface is arranged at an edge of said second guide slot.

* * * * *